(12) United States Patent
Kameli (10) Patent No.: US 11,595,506 B2
(45) Date of Patent: Feb. 28, 2023

(54) CELLPHONE SELF-STANDING DEVICE

(71) Applicant: Nader Kameli, Lombard, IL (US)

(72) Inventor: Nader Kameli, Lombard, IL (US)

(73) Assignee: AKBI Enterprises, LLC, Lombard, IL (US)

( * ) Notice: Subject to any disclaimer, the term of this patent is extended or adjusted under 35 U.S.C. 154(b) by 0 days.

(21) Appl. No.: 17/151,806

(22) Filed: Jan. 19, 2021

(65) Prior Publication Data
US 2022/0232113 A1   Jul. 21, 2022

(51) Int. Cl.
*H04M 1/11*   (2006.01)
*F16M 13/00*   (2006.01)

(52) U.S. Cl.
CPC ............ *H04M 1/11* (2013.01); *F16M 13/005* (2013.01); *F16M 2200/021* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,010,701 B1* | 4/2015 | Cooper | .................... | G10G 5/00 84/327 |
| 9,288,920 B1* | 3/2016 | Steiner | .................. | F16M 11/10 |
| 9,644,783 B2* | 5/2017 | Rinner | .................... | F16M 11/38 |
| 2005/0205728 A1* | 9/2005 | Avery | .................. | F16M 11/045 248/316.1 |
| 2006/0146487 A1* | 7/2006 | Huang | .................. | F16M 11/38 248/917 |
| 2007/0122141 A1* | 5/2007 | Agevik | .................. | G03B 17/56 396/419 |
| 2009/0114790 A1* | 5/2009 | Fan | ........................ | F16M 11/38 248/346.5 |
| 2009/0218454 A1* | 9/2009 | Stanley | .................. | F16M 13/00 248/306 |
| 2012/0145878 A1* | 6/2012 | Zoll | ........................ | F16M 11/38 248/688 |
| 2013/0001381 A1* | 1/2013 | Hu | .......................... | F16M 11/10 248/168 |
| 2015/0201113 A1* | 7/2015 | Wood | .................... | F16M 11/041 348/376 |
| 2016/0088749 A1* | 3/2016 | Liu | ........................ | F16M 13/022 248/688 |
| 2016/0252207 A1* | 9/2016 | Hollenberg | ............ | G01D 11/30 73/866.5 |
| 2020/0137909 A1* | 4/2020 | Field | ....................... | F16M 11/38 |

\* cited by examiner

*Primary Examiner* — Monica E Millner (57) ABSTRACT

Embodiments relate to a cellphone self-standing device that allows any cellphone to stand in position and angles that are more suited for selfie and two way video communication. The device of this invention integrates with the cellphone such that it can be carried around easily, the same way that cellphones are; store with the cellphone in where cellphones are normally stored; and operate on demand with minimal set up, to facilitate ease of use.

12 Claims, 6 Drawing Sheets

Tilt Backward

Tilt Forward

CELLPHONE SELF-STANDING DEVICE

BACKGROUND

Today's cellphones have cameras built in that have replaced dedicated photography cameras for most daily and casual applications. Each cellphone has a rear facing camera that is used by an operator to take pictures of others, sceneries and things, and has a front facing camera that is used to take selfies and pictures where the camera operator is also a part of the photo.

Invention of operator facing cameras enabled a new way of taking pictures where the operator of the camera can also be a subject of the photography. This type of self photography is called Selfie. In order to take a picture of a scene with the operator in it, the phone has to be moved away from the operator. This is done by the operator holding the phone in one hand and extending the arm. The limitation of such method is the length of the arm, as the camera cannot be moved away further than the arm can be extended, and therefore the field of view is limited to the angle that is create between the camera and the location of the operator. Such limited angle of view limits how many people can be in the picture, or how wide of a view can be captured by the camera. In order to take photos with camera operator in it that has the right proportion with the rest of the items in the scene, the camera has to be moved further away.

To address this challenge, several products have been developed and introduced to market. There are tripods that hold the phone like a camera tripod and allow the user to separate from the phone and join the scene, and operate the phone at a distance. There are also selfie arms that are telescopic devices that hold the phone and become an extension of the user's arm. These selfie arms allow the user to move the phone farther away by a foot or so and operate it manually with the operator in the scene. Selfie arms that are longer than 2 feet are hard to manage and can cause the camera to shake and the photo to come out unfocused.

The challenge with all the products that support selfies is that they are bulky and require additional space to carry them. The current solutions take away from the compactness and portability of the cellphones, and turn them in to a photography system that they are not meant to be. The tradeoff between the quality of a professional camera and a cellphone camera is the ease-of-use, portability and compact nature of the cellphone. Selfies are impromptu photos that users would like to take of a scene or an event. Though users always have their phone with them, they do not always have a selfie device that facilitates taking selfie photos, nor they desire to have a toolbox carried around with them to address such unplanned acts.

SUMMARY

Embodiment of the present disclosure relates to a device that can be attached to a cellphone with or without a protective case, providing the ability to stand freely to the cellphone. Using this device the cellphone can stand on any flat surface in a secure manner. The device will further allow the cellphone to be tilted forward and backward, and stay in the selected position apart from the operator.

This device is to be a permanent attachment that is always with the cellphone and is carried around just as a cellphone would.

It is an object of the invention to provide a cellphone the ability to stand perpendicular to any flat surface.

It is an object of the invention to provide a cellphone the ability to independently stand tilted forward or backward as desired by its operator.

It is an object of the invention to integrate the mechanism that provides the ability to take selfies from any angle to the cellphone.

It is an object of the invention to provide the ability to integrate the self standing device to a cellphone with or without a protective cover.

BRIEF DESCRIPTION OF THE DRAWINGS

The accompanying drawings illustrate non-limiting example embodiments of the invention.

DETAILED DESCRIPTION

Throughout the following description, specific details are set forth in order to provide more thorough understanding of the invention. However, the invention may be practiced without these particulars. In other instances, well known elements have not been shown or described in detail in order to avoid unnecessary obscuring the invention. The drawings show, by way of illustration, specific embodiments in which the invention may be practiced. These embodiments may be combined, other elements may be utilized or structural or material changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usage between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B, and C", unless otherwise indicated. In the appended aspects or claims, the terms "first", "second", and "third", etc. are used merely as labels, and are not intended to impose numerical requirements on their objects.

Overview

Embodiment of the present disclosure relates to a mechanism that would be attached to any cellphone similar to the way a protective case would be, providing the cellphone the ability to stand in any position that the user decides and wishes to. Though currently there are many products available that offer such capability, they are all bulky devices that take away from the portability of the cellphone and treat the cellphone like a standalone professional camera that the it is not designed or intended to be.

There are tripods, similar to those used with photography or video recording cameras, that are modified to accommodate a cellphone.

There are small stands that are designed to accommodate viewing need of the cellphone user. These stands are made to tilt the phone back so that the user can watch movies or still images. They are made for one way viewing where the user is viewing something displayed on the phone screen.

The current cellphone stands are not made to accommodate normal two-way viewing where the user is being viewed by the party on the other side of the phone connection with the normal angle of view. In cases where the users use such stands for hand-free video streaming, the angle of view is not right and the other side is either viewing the inside of the nostrils of the cell owner or watching an image that is not at all similar to or intended by the user.

Similarly these stands are not made for taking selfies as they are unable to keep the cellphone completely vertical, and in all cases they have to have a backward tilting position that points the camera not straight, but in the upward direction.

A tripod can address the issue of having the right angle of view for pictures and video streaming But they are bulky and not as portable as phones are. Most users carry their phones in their hands, pockets or small purses. Though a tripod maybe usable in office or in home, they are not ideal for life on the road.

Even in home or office surrounding, it is difficult to take out and setup a tripod in case a video call comes in, as those calls are usually unplanned and catch the user by surprise. Similarly it is too time consuming to have to pull out the tripod and set it up in order to take a selfie photo.

We are living in the age of social medial where people like to take pictures of events, activities, scenes, etc. and/or record videos and stream them live. Many look to do all of these with themselves in the picture or the video. So, it is desirable to have a solution that allows the cellphone camera to operate as desired and record the camera operator in the scene. This impromptu snaps and recordings are result of portability of the camera inside the phones, and their immediate availability.

Users are not willing to carry a tripod with them at all times in case a need for selfie arises. And even if they did, the time that it takes to take the tripod out, expand it, attach it, and take a selfie, takes away the willingness of the user from the capture of the scene. It is just too hard and the benefit does not outweigh the cost in time and hassle.

The embodiments of the present disclosure address the need by offering a device that becomes an integral part of a cellphone, gives it the ability to independently stand on any flat surface, stay fixed in any tilted position, has a quick setup, that allows the user to take selfie anytime and anywhere they wish to do so.

The embodiment of the present disclosure is a device that contains all the features needed to address the shortcoming of current solutions as stated above, and is expected to mate with the phone such that it is carried around with the phone at all times, similar to a phone case.

The device has side panels that are expected to attach to the long sides of the phone giving device legs clearance to swing to the area in front and behind the screen view of the phone.

The device contains a mechanism that allows the side panels of the device to grab on to the phone. The mechanism may use a spring loaded clamping mechanism to grab the phone, or be glued to each long side of the phone or phone case, or any other way that would allow the phone and the said standing mechanism to be integrated such that they do not easily come apart.

The grabbing mechanism may be used on a naked cellphone, or a cellphone with a protective case.

The device has legs that extend forward, and others that extend backward, holding the phone in place, preventing any accidental tilt or fall. These legs can be used individually or together.

The legs have locking mechanisms that hold them in any position desired by the user, able to withstand the weight of the cellphone, preventing any accidental movement or fall.

The legs are integrated in to the side panels of the device, such that when not extended they are protected and do not interfere with normal operation of the cellphone.

In an embodiment, the front legs are connected together such that they operate in concert, and the rear legs are connected together to do the same.

In an embodiment the side panels contain the front extending legs and the rear extending legs are placed behind the cellphone such that they create the ability to hold the phone in place and prevent it from falling backward.

In an embodiment the front and the rear legs are connected using a mechanism that self adjusts the position of the legs by simply moving the phone to the desired position, pushing front legs back and rear legs towards the cellphone, or vise versa.

In an embodiment the legs are built in to a cellphone case.

In an embodiment the side panels are attached to the cellphone using means of adhesion such as glue or two-sided tape, etc. eliminating the need for a clamping mechanism on the back that would hold the side panels attached to the cellphone.

Definitions

As used herein, "cellphone" refers to a mobile phone, a smart phone, a tablet computer, or any flat non-foldable computing device with a built-in screen and camera.

As used herein, "leg(s)" refers to a structure that is made of solid material that cannot be easily bent. It is longer in one dimension. It is connected to a structure on one side, and is used to support the structure.

As used herein, "foot" refers to a structure that is made of solid material that cannot be easily bent. It is connected to a leg on one side. It allows the leg to form a support for the structure that the leg is connected to.

DESCRIPTION

Figure 1:
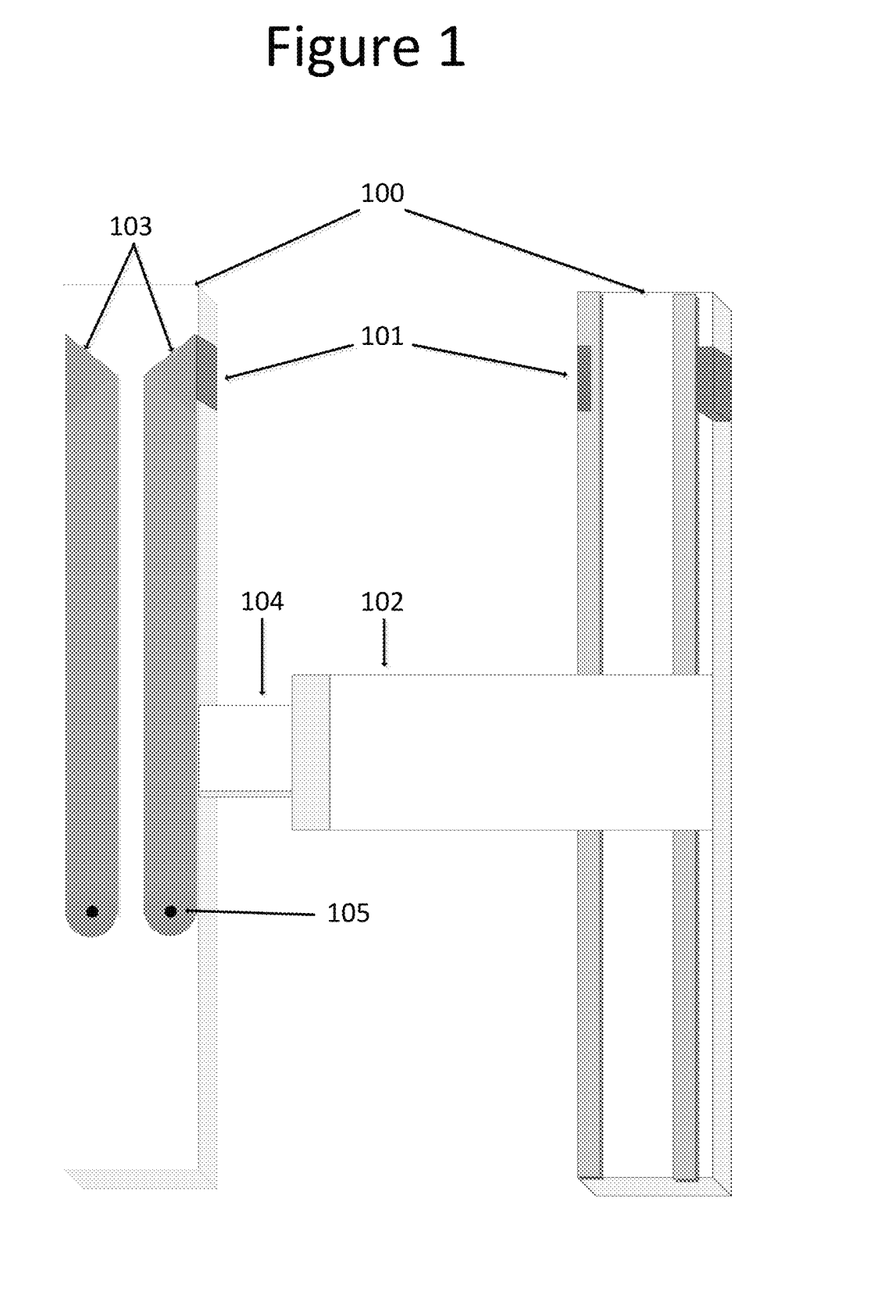
FIG. 1 is a view of the cell phone stand by itself.

FIG. 1 illustrates the cellphone self-standing device. The device has two sides, 100, that are designed to attach to the sides of a cellphone. The two sides, 100, are attached together using a spring loaded clamp, 102. The clamp, 102, has an arm, 104, which is normally retracted inside the body of the clamp, 102, and can be extended out using force. The extension of the arm 104, outside the body of the clamp 102, will allow the sides to separate allowing a cellphone to be placed in between the sides 100. Upon release of the force the sides will be pulled together, therefore, securely attaching the device to the cellphone. Each side, 100, has two legs, 103, embedded within its body such that when the legs are closed it forms a flushed surface. Each leg, 103, has one foot, 101, which is used, when the legs are extended open, to provide stability to the standing posture. Each leg is secured on one side by a securing mechanism, 105, that allows the legs to rotate around and open or close. The securing mechanism of 105 has a built-in mechanism that requires force to open and close the leg, and keeps the legs in any position that the user desires.

Figure 2:
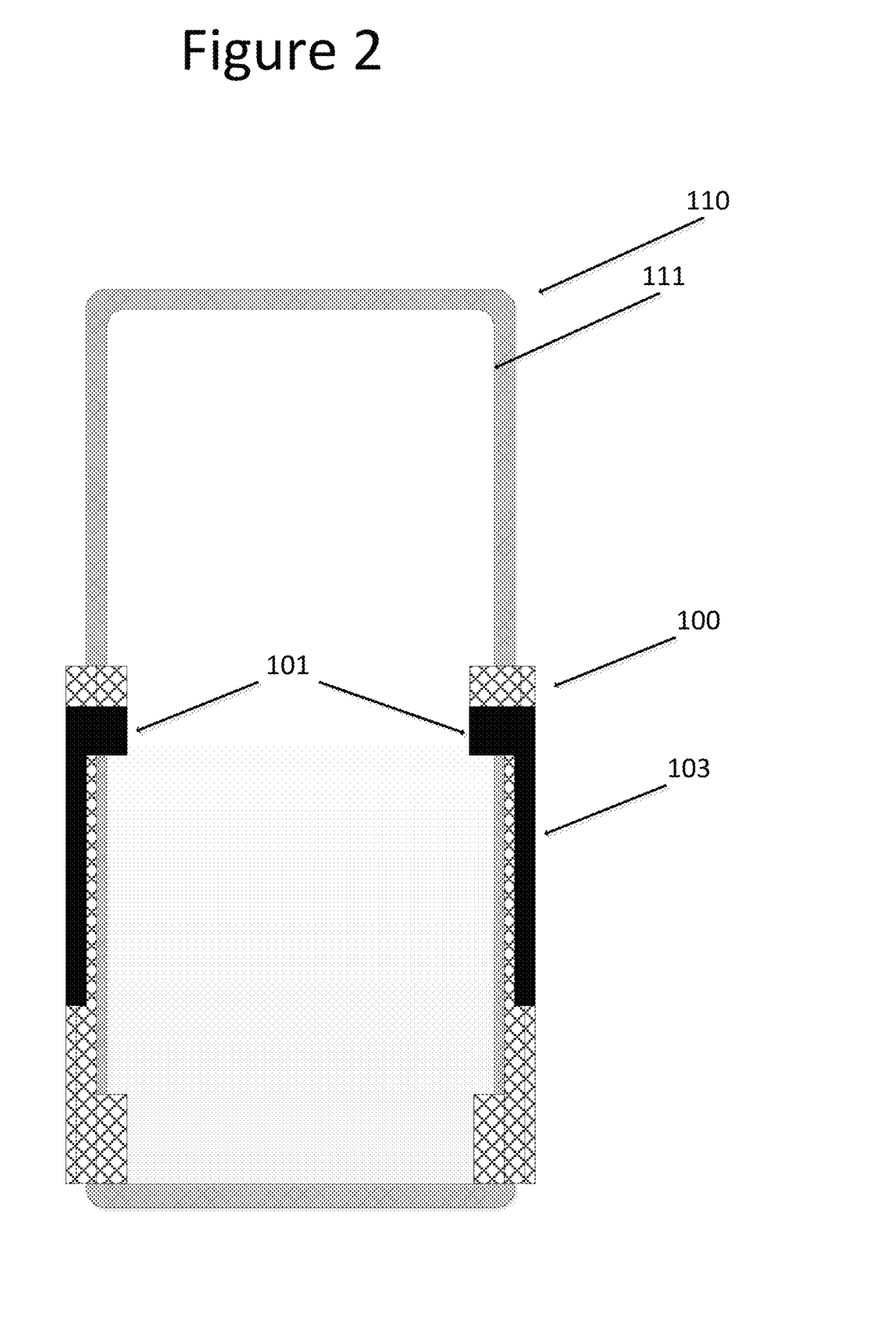
FIG. 2 is a front view of the cell phone stand, while attached to a cell phone.

FIG. 2 illustrates the cellphone self-standing device attached to a cellphone, 110. The illustration shows the front facing view of the cellphone. The cellphone 110 is depicted with its viewing screen, 111, facing the user. Illustration shows the stand in its closed form, attached to the cellphone. The cellphone self-standing device is attached to the cellphone using its cellphone grabbing sides, 100. The sides, 100, show the legs 103, fully closed, and the feet, 101, in their resting position.

Figures 3, 4:
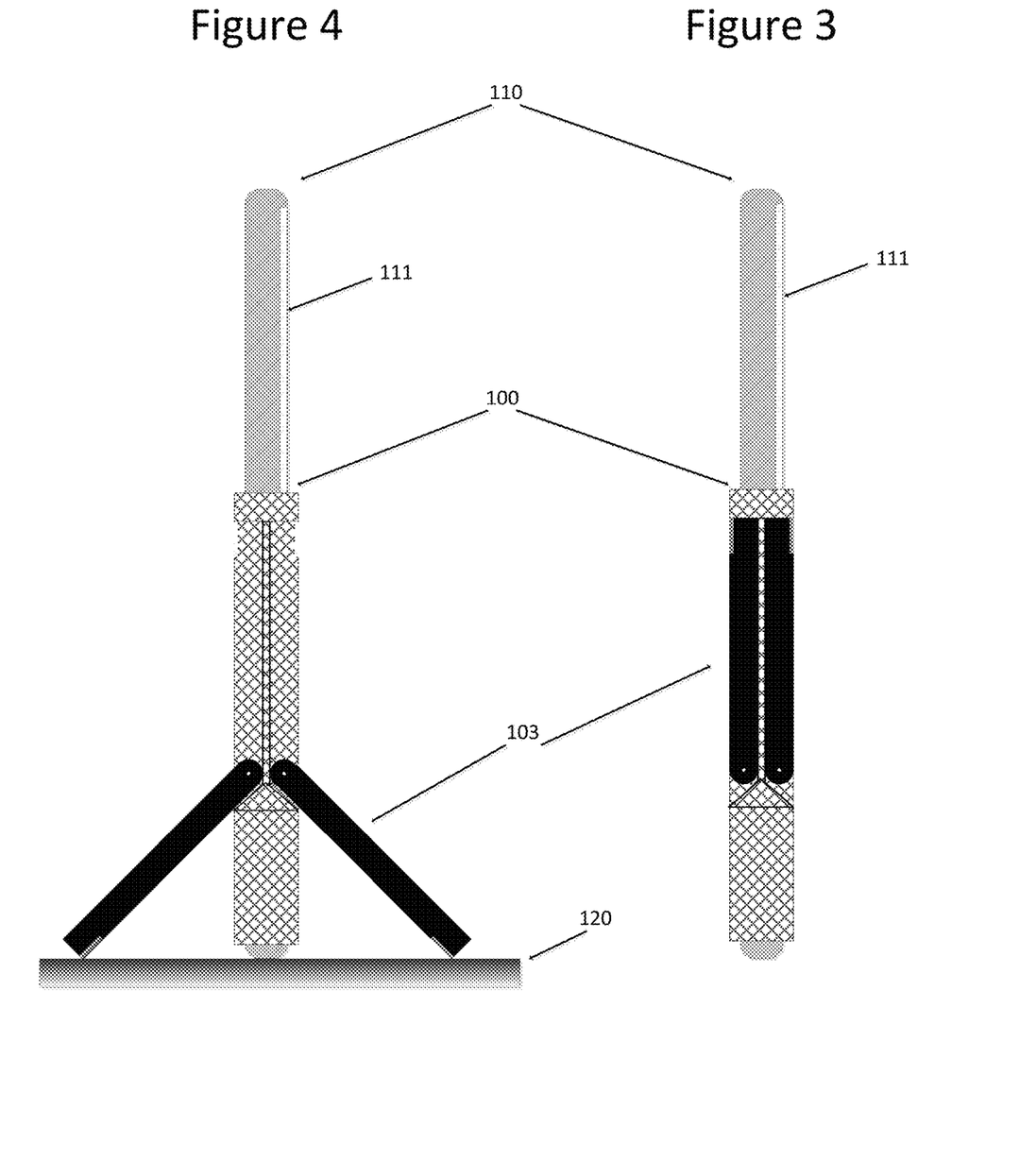
FIG. 3 is a side view of the cellphone self-standing device attached to a cellphone, with the cellphone stand legs closed.
FIG. 4 is a side view of the cellphone self-standing device attached to a cellphone, with the cellphone stand legs extended in front and in rear of the cellphone.

FIG. 3. Illustrates the cellphone self-standing device attached to a cellphone, 110. The illustration shows the side view of the cellphone.

FIG. 4. Illustrates the side view of the cellphone self-standing device attached to a cellphone, 110. The legs, 103, extended to reach the standing surface, 120. The phone is standing in a position that is perpendicular to the standing surface. Both legs on both sides are extended to form a sturdy and reliable stand that holds the cellphone in the desired position.

Figure 5:
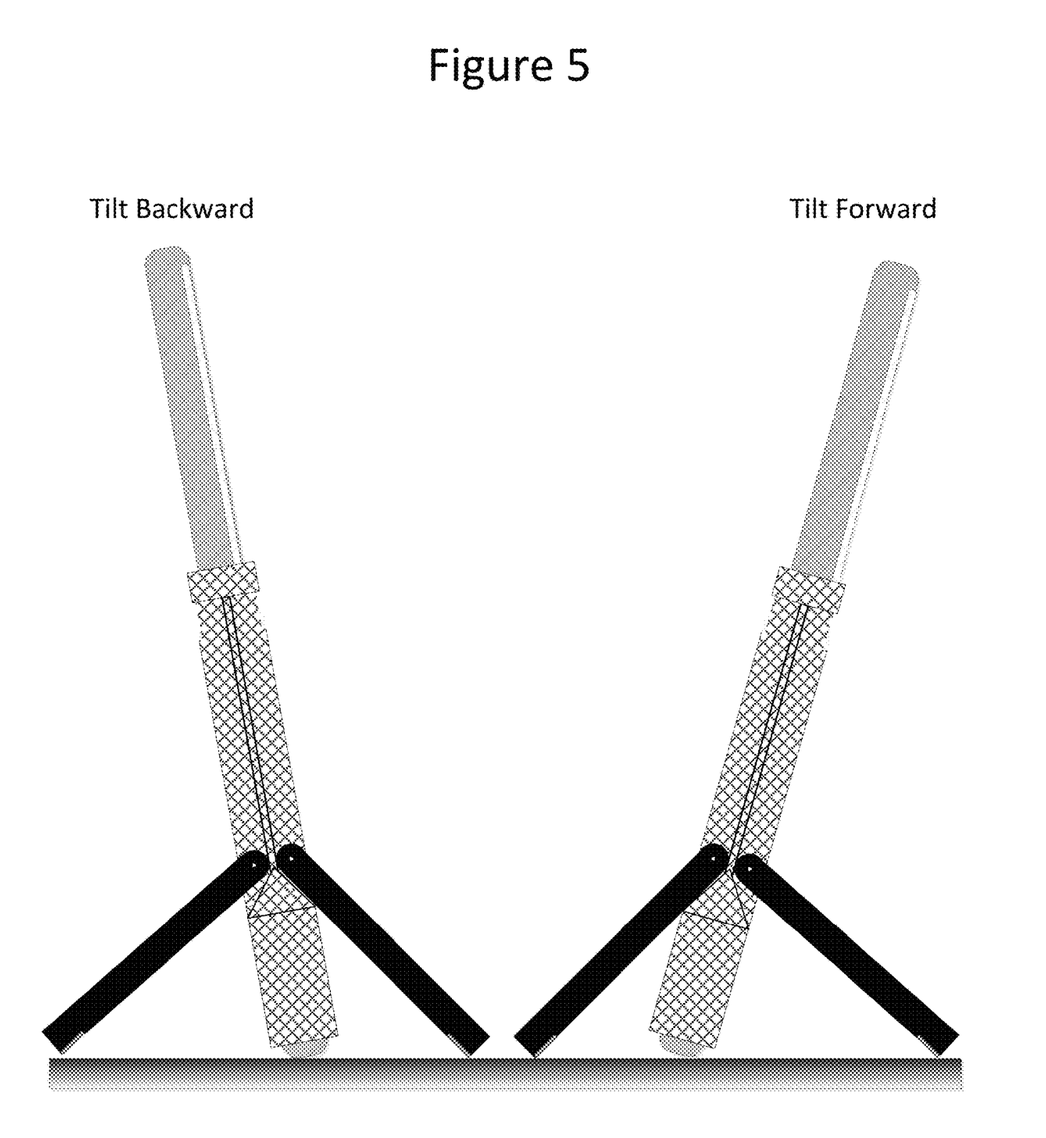
FIG. 5 is a side view of the cellphone and the cellphone self-standing device with the cellphone tilted forward and backward, using both front and rear legs.

FIG. 5. Illustrates the side view of the cellphone inside the cellphone self-standing device when the cellphone is tilted backward and forward with both the front legs and rear legs extended to create a secure stand.

Figure 6:
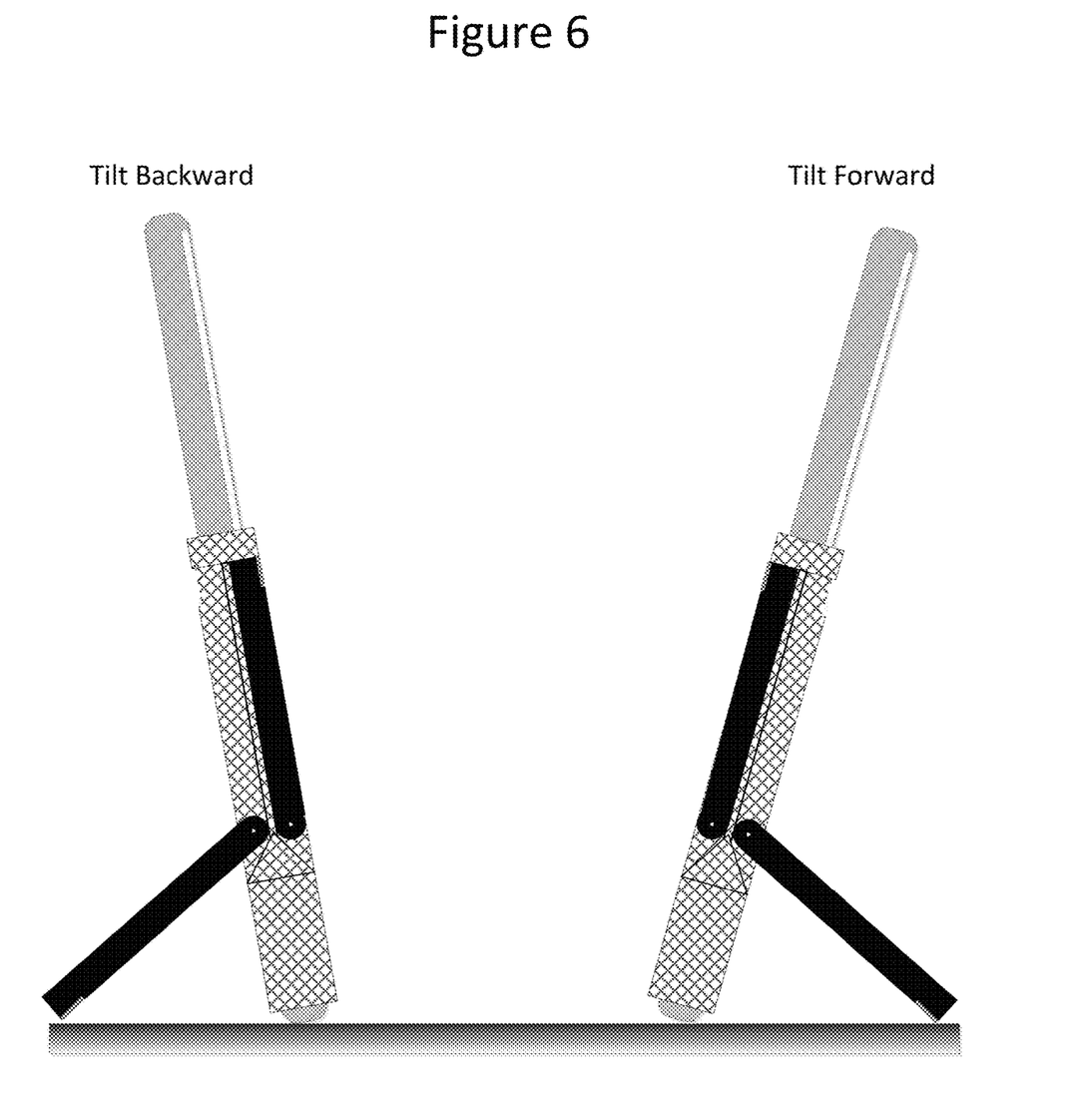
FIG. 6 is a side view of the cellphone and the cellphone self-standing device with the cellphone tilted forward and held in position using the front legs, and tilted backwards and held in position using the rear legs, only.

FIG. 6. Illustrates the side view of the cellphone inside the cellphone self-standing device with only the rear legs extended when the cellphone is tilted backward, and only the front legs extended when the phone tilts forward.

Figure 7:
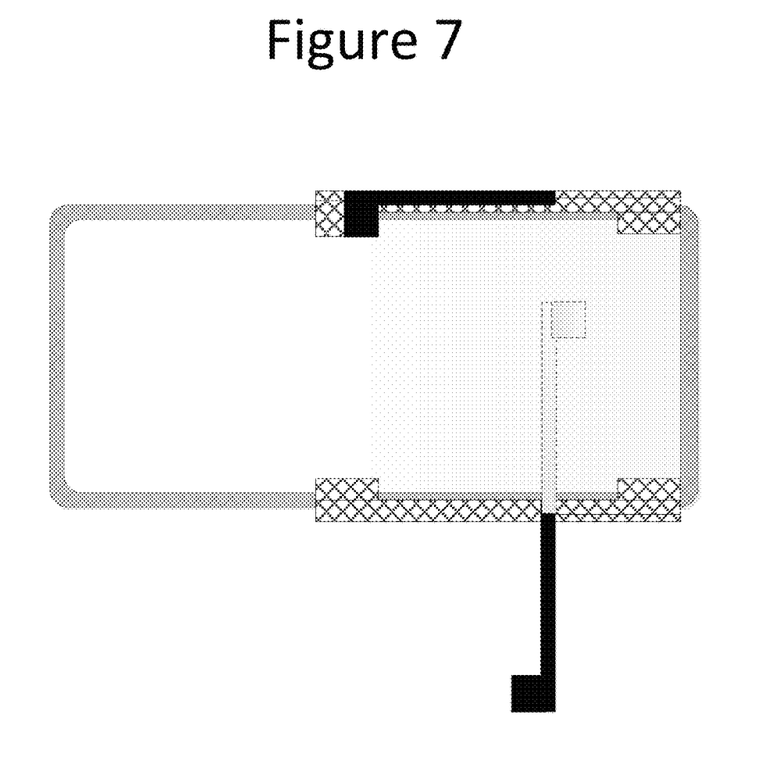
FIG. 7 is a front view of the cellphone and the cellphone self-standing device when the cellphone is on its long side, with the legs on the bottom side panel of the cellphone stand extended.

FIG. 7. Illustrates the front view of the cellphone inside the cellphone self-standing device with the phone lying on its long side. Both legs, attached to the side panel of the cellphone self-standing device, attached to the bottom of the cellphone, are extended, forming a three point support that holds the cellphone in position and prevents it from falling forward or backward.

Figure 8:
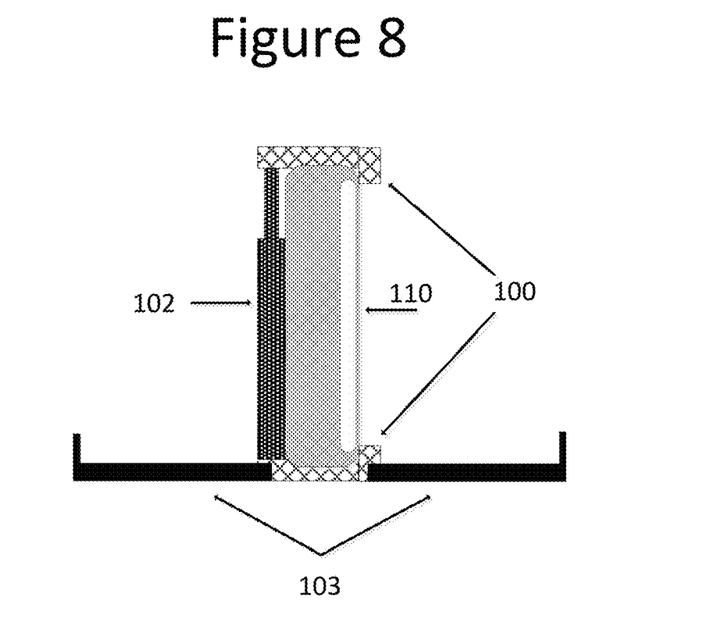
FIG. 8 is a side view of the cellphone and the cellphone self-standing device when the cellphone is on its long side, with the legs on the bottom side panel of the cellphone stand extended.

FIG. 8. Illustrates the side view of what is depicted in FIG. 7. The stand device sides, 100, are held tightly against the phone, 100, using the spring loaded clamp, 102, that is attached to both side, and the legs, 103, are extended forming a 90 degree angle between the cellphone and the flat surface that the phone would be resting on.

The cellphone self-standing device described herein is only one embodiment of the herein described invention. There are other method and structural designs that would allow the device of this invention to stay in place and perform its function as intended.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

What is claimed is:

1. A cellphone self-standing device, for supporting a cellphone relative to a support surface, the cellphone self-standing device comprising: two side panels; and a mechanism that attaches the side panels to two sides of the cellphone; and a plurality of legs secured to the said side panels such that legs are moveable between an open position and a close position; wherein in the open position the legs are configured to land on the support surface in front of the viewing screen of the cellphone or rear of the viewing screen of the cellphone; and in the closed position the legs are secured and housed flush in each of the side panels on the two sides of the cellphone.

2. A cellphone self-standing device of claim 1, wherein the said legs are attached to side panels using a locking mechanism that holds each leg in any position selected by a cellphone operator.

3. A cellphone self-standing device of claim 1, wherein the said side panel attachment mechanism is a spring-loaded clamp.

4. A cellphone self-standing device of claim 1, wherein the said side panel attachment mechanism is an adhesive such as glue, tape, rivet.

5. A cellphone self-standing device of claim 1, wherein the said legs operate independent of one another.

6. A cellphone self-standing device of claim 1, wherein the said legs operate in coordination with one another.

7. A cellphone self-standing device of claim 1, wherein one or more of the said legs swing in position towards the front of the said cellphone viewing screen.

8. A cellphone self-standing device of claim 1, wherein one or more of the said legs swing in position towards the rear of the said cellphone viewing screen.

9. A cellphone self-standing device comprising:
   A cellphone case that houses a cellphone; and
   Two side panels; and
   A mechanism that attaches the side panels to two sides of the cellphone case; and
   A plurality of legs secured to the said side panels such that legs are moveable between an open position and a close position; wherein in the open position the legs are configured to land on the support surface in front of the viewing screen of the cellphone or rear of the viewing screen of the cellphone; and
   In the closed position the legs are secured and housed flush in each of the side panels on the two sides of the cellphone.

10. A cellphone case, with integrated self-standing device, for supporting the cellphone relative to a support surface, wherein the case with the integrated self-standing device comprises:
   A housing that is attached to a cellphone; and
   A plurality of legs housed in two opposing sides of the said attached housing, wherein each side is adjoined to the viewing screen of the said cellphone on one edge and the rear plain of the housing on the other edge, such that the legs are moveable between an open position and a close position; wherein in the open position the legs are configured to land on the support surface in either a front of the viewing screen of the cellphone or a rear of the viewing screen of the cellphone; and
   In the closed position the legs are secured and housed flush inside the opposing sides of said housing.

11. A cellphone case of claim 10, wherein one or more of the said legs extend towards the front of the case.

12. A cellphone case of claim 10, wherein one or more of the said legs extend towards the rear of the case.

* * * * *